United States Patent [19]

Hamatsu et al.

[11] Patent Number: 5,008,898
[45] Date of Patent: Apr. 16, 1991

[54] CARRIER MODULATING DEVICE FOR A SPREAD SPECTRUM COMMUNICATION DEVICE

[75] Inventors: Mashiro Hamatsu; Mamoru Endo, both of Tokyo, Japan

[73] Assignee: Clarion Co., Ltd., Tokyo, Japan

[21] Appl. No.: 496,354

[22] Filed: Mar. 20, 1990

[30] Foreign Application Priority Data

Mar. 30, 1989 [JP] Japan ................... 1-76789

[51] Int. Cl.$^5$ .............................................. H04L 9/00
[52] U.S. Cl. .............................................. 375/1; 380/34
[58] Field of Search ............................... 380/34; 375/1

[56] References Cited

U.S. PATENT DOCUMENTS

| 4,672,629 | 6/1987 | Beier | 375/1 |
| 4,754,465 | 6/1988 | Trimble | 375/1 |
| 4,761,795 | 8/1988 | Beier | 375/1 |
| 4,866,734 | 7/1989 | Akazawa et al. | 375/1 |
| 4,888,787 | 12/1989 | Kisak | 375/1 |
| 4,908,837 | 3/1990 | Mori et al. | 375/1 |
| 4,924,188 | 5/1990 | Akazawa et al. | 375/1 |

FOREIGN PATENT DOCUMENTS 63-73730  4/1988  Japan .

OTHER PUBLICATIONS

English-language Abstract of Japanese Reference No. 63-73730 (1 page).
Extracted translation of Japanese Publication No. JP-A-63-73730 (1 page).

Primary Examiner—Salvatore Cangialosi
Attorney, Agent, or Firm—Flynn, Thiel, Boutell & Tanis

[57] ABSTRACT

In a carrier signal modulating device a carrier signal is modulated by using a square phase sequence as a PN code.

7 Claims, 3 Drawing Sheets

FIG. I (A)
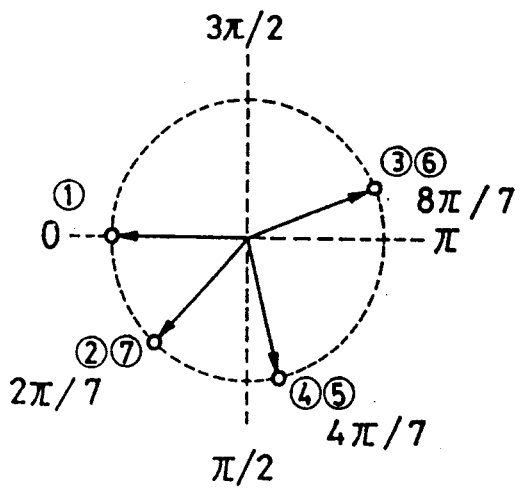
FIG. I (B)
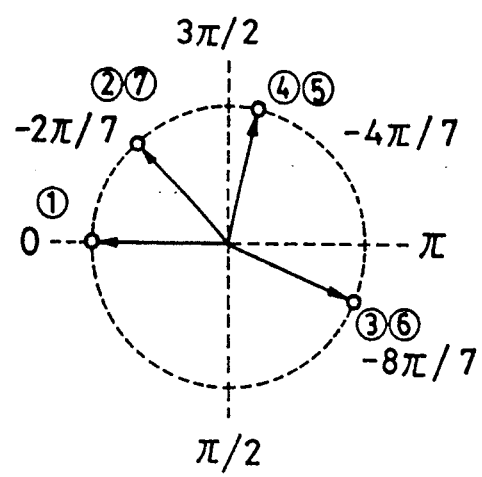
FIG. 2
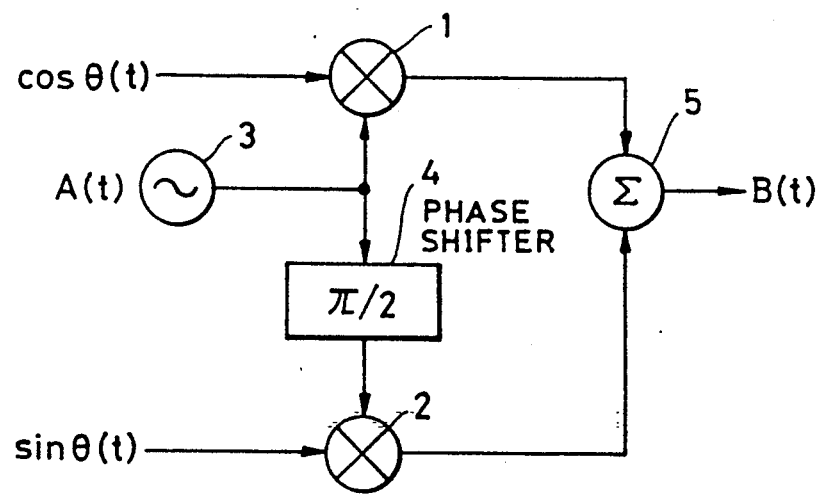

CARRIER MODULATING DEVICE FOR A SPREAD SPECTRUM COMMUNICATION DEVICE

FIELD OF THE INVENTION

The present invention relates to a spread spectrum communication device and in particular to a new carrier modulating device for a spread spectrum communication device using a square phase sequence as a pseudo noise code.

BACKGROUND OF THE INVENTION

Heretofore various sorts of communication systems have been investigated and developed. Among them the spread spectrum communication (hereinbelow abbreviated to SSC) system is well known.

By this SSC system, on the transmitter side, a signal such as data, sound, etc. having a wide band to be transmitted by using a pseudo-noise code (PN code) and, on the receiver side, this wide band signal is spread inversely into the original narrow band by means of a correlator to reproduce the signal. Recently attention is paid to this communication system, because it has always a very high reliability from the point of view that it is strong against external interference and noise, that it has a high secrecy, etc.

At present, for the wireless SSC, a correlator, which is thought to be the most simple and convenient and to have a high reliability, is a device using surface acoustic wave (hereinbelow abbreviated to SAW).

In the SAW correlator there are, in general, those of correlator type (tapped delay line type) and those of convolver type. Here, although those of correlator type have a simple construction and generally a high efficiency, the temperature coefficient of the substrate has remarkable influences thereon. On the other hand, although those of convolver type are hardly influenced by variations in the temperature, they have, in general, a low efficiency. In addition, concerning the PN code described above, the code is fixed for those of correlator type, while it can be freely changed for those of convolver type.

Consequently correlators of convolver type are more easily used, provided that the efficiency is at a practically usable level.

On the other hand, as the PN code used in the SSC system, heretofore binary sequences such as an M sequence, a GOLD sequence, etc. have been principally used owing to the simplicity of the code generation. However, since the cross-correlation value of these binary sequences is not always small, in the spread spectrum multiple access (hereinbelow abbreviated to SSMA) communication they cause often cross-talk. As a PN code for the purpose of solving such a problem, recently a square phase sequence (minimum cross-correlation multiple phase orthogonal sequence) as described in JP-A-63-73730 has been proposed.

The square phase sequence is a complex number sequence having a period N (N being a code length), by which the self correlation function is zero except for the shifts, which are integer times as long as the code length N and further the absolute value of cross-correlation functions between different sequences having a same code length is $1/\sqrt{N}$, when it is nomalized, taking the 0-shift component of the self correlation function as 1. That is, it realizes the mathematical lower limit of the peak value of the absolute value of the cross-correlation function between orthogonal sequences.

Although the square phase sequence is a PN code suitable for the SSMA communication, heretofore no spread spectrum modulating device using the square phase sequence is known.

Further, as a correlator for the square phase sequence, that described similarly in JP-A-63-73730 is known. However no case where an SAW convolver is used as a correlator is studied.

OBJECT OF THE INVENTION

Therefore a first object of the present invention is to provide a spread spectrum modulating device in the case where the square phase sequence is used as a PN code.

Furthermore a second object of the present invention is to provide a spread spectrum modulating device for the reference signal in a spread spectrum communication device using an SAW convolver as a correlator and the square phase sequence as a PN code.

SUMMARY OF THE INVENTION

In order to achieve the first object described above, a carrier modulating device for an SSC device according to the first present invention is characterized in that it consists of means for modulating a carrier signal by using a square phase sequence, which comprises a memory for storing phase patterns corresponding to the real and the imaginary component of the square phase sequence; a counter for reading out data corresponding to each of the phase patterns from the memory described above; D/A converting means for converting the two sets of digital data thus read out from the memory described above into respective analogue signals; means for generating carrier signals, which are orthogonal to each other; first multiplying means for multiplying one of the analogue data signals stated above by one of the carrier signals stated above; second multiplying means for multiplying the other analogue data signal by the other carrier signal; and means for adding the outputs of the two multiplying means to each other.

Further, in order to achieve the second object described above, a spread spectrum modulating device for reference signal for an SSC device using a SAW convolver as the correlator and a square phase sequence as the PN code according to the second present invention is characterized in that it is provided with a first memory for storing a phase pattern corresponding to the imaginary component of the square phase sequence in a received signal; a second memory for storing a phase pattern corresponding to the real component of the square phase sequence in the received signal; a counter for reading out digital data corresponding to each of the phase patterns from the memories described above; first D/A converting means for converting the digital data thus read out from the first memory into an analogue signal; second D/A converting means for converting the digital data thus read out from the second memory into another analogue signal; first carrier generating means; second carrier generating means for generating a carrier signal, whose phase is retarded by 90° with respect to that of the first carrier signal; first multiplying means for multiplying the output of the first D/A converting means stated above by the first carrier signal stated above; second multiplying means for multiplying the output of the second D/A converting means stated above by the second carrier signal stated above; and means for adding the outputs of the two multiplying means to each other.

BRIEF DESCRIPTION OF THE DRAWINGS

FIGS. 1(A) and 1(B) show the phase transition state of square phase sequences $C_1$ and $C_1^*$;

FIG. 2 is a block diagram indicating a basic structure of the present invention;

DETAILED DESCRIPTION

Figure 3:
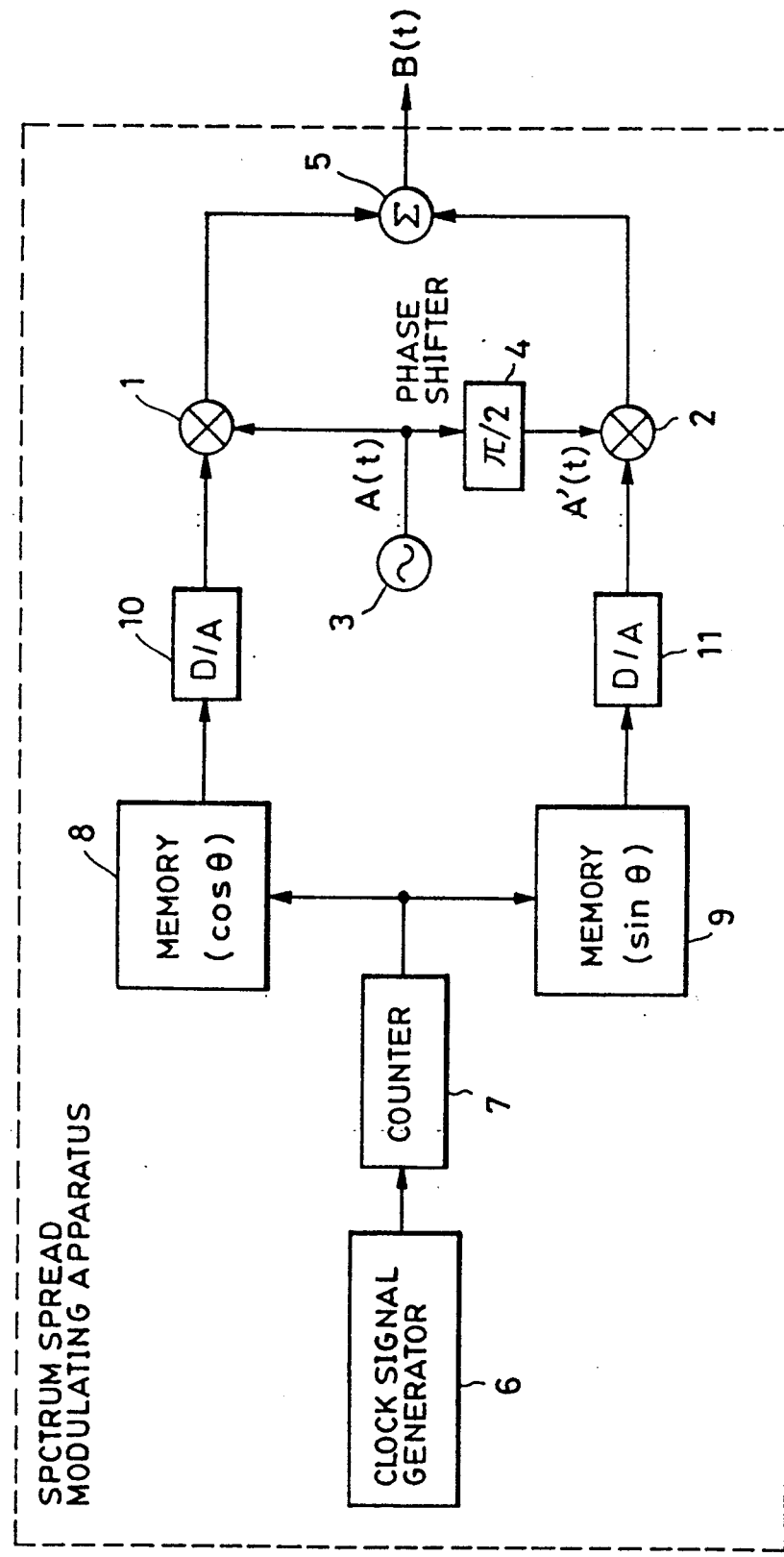
FIG. 3 is a block diagram illustrating an embodiment of the present invention.

Now the working principle of the device according to the present invention described previously will be explained. An algorithm for generating the square phase sequence used for realizing the present invention is as follows. There exist $N-1$ sorts of square phase sequences having a code length N (n being an odd prime number). $C_m$ representing them, the elements thereof $C_{mi}$ can be expressed, in general, by;

$$C_{mi} = \exp\{(2\pi \sqrt{-1}/N)mi^2\} \quad (1)$$

where $m = 1, 2, \ldots, N-1; i = 0, 1, \ldots, N-1$ (Example) Square phase sequences $C_1$ and $C_1^*$ having a code length 7 (N=7), which are imaginary conjugates with respect to each other, are given by;

$$C_1 = \{1, \omega^1, \omega^4, \omega^2, \omega^2, \omega^4, \omega^1\} \quad (2)$$
$$C_1^* = \{1, \omega^6, \omega^3, \omega^5, \omega^5, \omega^3, \omega^6\} \quad (3)$$

where $\omega = \exp(2\pi \sqrt{-1}/7)$

A signal B(t) obtained by spread-spectrum modulating (hereinbelow abbreviated to SS modulating) a carrier signal A(t) with a PN code, which is a square phase sequence, can be expressed, in general, as follows;

$$A(t) = a \cdot \cos \omega_c t \quad (4)$$

$$B(t) = a \cdot \cos \{\omega_c t + \theta(t)\} \quad (5)$$

where $a$ represents a proportionality constant representing the amplitude of the carrier signal; $\omega_c$ the angular frequency of the carrier signal; and $\theta(t)$ a phase term variable in time corresponding to the square phase sequence.

For example, various values of $\theta(t)$ for different times T corresponding to the square phase sequences $C_1$ and $C_1^*$ expressed by Equations (2) and (3) are given in TABLE 1.

FIGS. 1(A) and 1(B) show the phase transition state of the square phase sequences $C_1$ and $C_1^*$ given by Transforming Equation (5), Equation (6) is obtained, as follows;

$$B(t) = a \cdot \{\cos \omega_c t \cdot \cos \theta(t) + \cos (\omega_c t + \pi/2) \cdot \sin \theta(t)\} \quad (6)$$

FIG. 2 is a block diagram indicating a fundamental circuit for realizing Equation (6), in which reference numerals 1 and 2 are mixers; 3 is a carrier signal generator; 4 is a 90° phase shifter; and 5 is an adder.

That is, in FIG. 2, the output of the carrier signal generator 3 is given to the phase shifter 4 to generate carrier signals A(t), A'(t), which are orthogonal to each other and which are applied to the mixers 1 and 2. After having been modulated with $\cos\theta(t)$ and $\sin\theta(t)$, they are added to each other in the adder 5. It is understood that the carrier signal B(t) SS modulated with the square phase sequence can be obtained in this was.

$$\text{Here } A'(t) = a \cdot \cos(\omega_c t + \pi/2) \quad (4)$$

is valid.

An embodiment of the present invention based on the working principle described above will be explained.

FIG. 3 is a block diagram indicating the embodiment of the spread-spectrum-modulating device according to the present invention, in which the reference numerals identical to those indicating in FIG. 2 represent identical or analogous circuits and 6 is a clock signal generator; 7 is a counter; 8 and 9 are memories; 10 and 11 are D/A converters.

In FIG. 3, the real component ($\cos\theta$) and the imaginary component ($\sin\theta$) the phase pattern $\theta$ corresponding to the square phase sequence are stored in the memories 8 and 9, respectively, and read-out with a period of the code length N, responding to a clock signal from the clock signal generator 6 by means of the counter 7. The two sets of digital data of the phase pattern thus read-out are converted into analogue signals by the D/A converters 10 and 11, respectively. Thereafter they are multiplied by the carrier signals A(t) and A'(t), which are orthogonal to each other, in the mixers 1 and 2, respectively. The carrier signal B(t) SS modulated by the square phase sequence is obtained by adding the output signals from the mixers 1 and 2 by means of the mixer 5.

In this way, it is possible to construct the spread spectrum modulating device, in the case where the square phase sequence is used as the PN code, by means of a very simple circuit.

Figure 4:
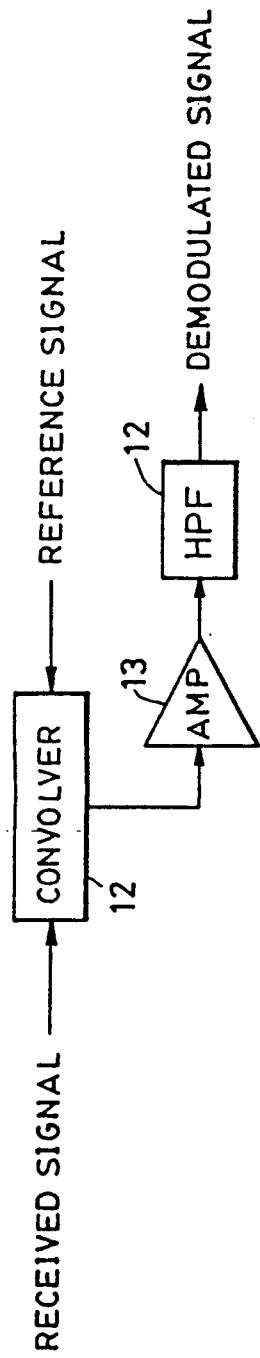
FIG. 4 is a block diagram illustrating an example of the construction of a correlating demodulating circuit, to which the present invention is applied.

FIG. 4 shows an example of the construction of a correlating demodulating circuit, in the case where an SAW convolver is used as the correlator and a square phase sequence is used as the PN code.

In FIG. 4, when a received signal SS modulated with the square phase sequence and a reference signal are inputted in the SAW convolver 12, an operation correlating the two input signals is effected in real time in the

TABLE 1

| Sequence | Time | | | | | | |
|---|---|---|---|---|---|---|---|
| | 1 | 2 | 3 | 4 | 5 | 6 | 7 |
| $C_1$ | 0 | $\frac{2\pi}{7}$ | $\frac{8\pi}{7}$ | $\frac{4\pi}{7}$ | $\frac{4\pi}{7}$ | $\frac{8\pi}{7}$ | $\frac{2\pi}{7}$ |
| $C_1^*$ | 0 | $-\frac{2\pi}{7}$ | $-\frac{8\pi}{7}$ | $-\frac{4\pi}{7}$ | $-\frac{4\pi}{7}$ | $-\frac{8\pi}{7}$ | $-\frac{2\pi}{7}$ |

SAW convolver 12. The correlation output obtained as the result is outputted as the correlation demodulation signal through an amplifier 13 and a high pass filter 14.

Now, in order that the self correlation operation of the two input signals is effected in the SAW convolver 12 to output a spike-shaped correlation demodulation signal, it is necessary that the square phase sequence for the received signal and the square phase sequence for the reference signal are in a relation of complex conjugate to each other.

For example, when $C_1$ in Equation (2) stated above is the square phase sequence for the received signal, the square phase sequence for the reference signal should be $C_1^*$ in Equation (3).

When B(t) in Equation (5) is the SS modulated signal corresponding to the received signal, the SS modulated signal $B^*(t)$ corresponding to the reference signal can be expressed, in general, as follows;

$$B^*(t) = a \cdot \cos\{\omega_c t - \theta(t)\} \quad (7)$$

Figure 5:
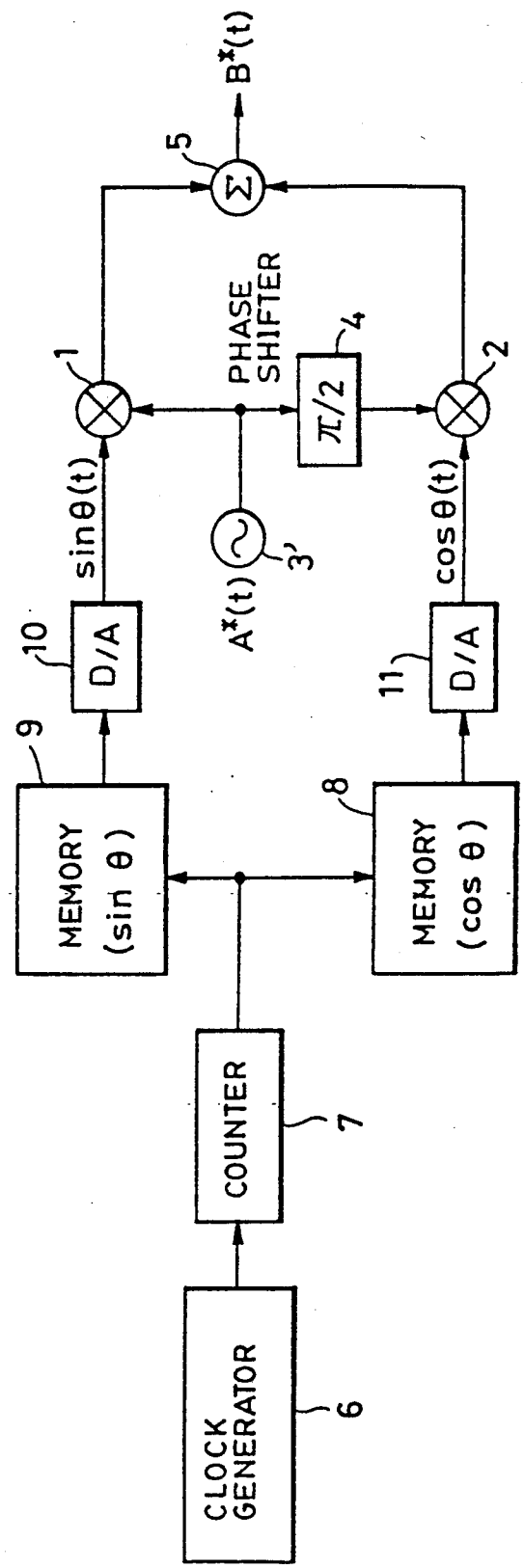
FIG. 5 is a block diagram of another basic structure of the present invention relating to the correlating circuit described above.

Transforming Equation (7), $$\begin{aligned} B^*(t) &= a \cdot \{\cos\omega_c t \cdot \cos\theta(t) + \sin\omega_c t \cdot \sin\theta(t)\} \\ &= a \cdot \{\sin\omega_c t \cdot \sin\theta(t) + \sin(\omega_c t + \pi/2) \cdot \cos\theta(t)\} \end{aligned} \quad (8)$$

is obtained. A fundamental circuit for realizing Equation (8) is indicated in FIG. 5.

As clearly seen from this figure, it is almost identical to that indicated in FIG. 2. Although the carrier signal $A^*(t)$ for the reference signal generated by the carrier signal generator 3' is represented by;

$$A^*(t) = a \cdot \sin \omega_c t \quad (9)$$

which differs in the phase by $\pi/2$ from the carrier signal A(t) given by Equation (4) for the received signal, since the two carrier signals are used usually asynchronously, this phase difference causes no essential problem.

Further, from FIG. 5, it is understood that the SS modulated signal $B^*(t)$ for the reference given by Equation (7) or (8) can be easily generated with the same circuit structure, only if the contents in the memories 8 and 9 are exchanged. That is, in order to obtain $B^*(t)$, it is sufficient that the content in the memory 8 is the imaginary component ($\sin\theta$) and the content in the memory 9 is the real component ($\cos\theta$).

As described above, also in the case where the SAW convolver is used as the correlator and the square phase sequence is used as the PN code, it is possible to obtain the correlation demodulation signal in a very simple manner.

As explained above, according to the present invention, it is possible to realize a spread spectrum modulating device using a square phase sequence as a PN code by means of a simple circuit construction and the contribution thereof is great particularly to the practical utilization of the SSMA communication system having a high reliability.

What is claimed is:

1. A spread spectrum modulating device comprising:
    means for generating first and second carrier signals, which are orthogonal to each other;
    first multiplying means for multiplying a first analog signal corresponding to a real component of a square phase sequence by said first carrier signal;
    second multiplying means for multiplying a second analog signal corresponding to an imaginary component of the square phase sequence by said second carrier signal; and
    means for adding the outputs of said first and said second multiplying means to each other.

2. A spread spectrum modulating device for reference signal for a spread spectrum communication device using a surface acoustic wave convolver as a correlator and a square phase sequence as a PN code, comprising:
    means for generating first and second carrier signals, which are orthogonal to each other;
    first multiplying means for multiplying a first analog signal corresponding to a real component of a square phase sequence by said first carrier signal;
    second multiplying means for multiplying a second analog signal corresponding to an imaginary component of the square phase sequence by said second carrier signal; and
    means for adding the outputs of said first and said second multiplying means to each other.

3. A spread spectrum modulating device according to claim 1, further comprising:
    memory means for storing phase patterns corresponding to the real and the imaginary component of the square phase sequence;
    a counter for reading out digital data corresponding to each of the phase patterns from said memory means; and
    D/A converting means for converting the digital data thus read out from said memory means into said first and said second analog signals.

4. A spread spectrum modulating device for reference signal according to claim 2, further comprising:
    memory means for storing phase patterns corresponding to the real and the imaginary component of the square phase sequence;
    a counter for reading out digital data corresponding to each of the phase patterns from said memory means; and
    D/A converting means for converting the digital data thus read out from said memory means into said first and said second analog signals.

5. A spread spectrum modulating device for reference signal according to claim 4, wherein said memory means includes a first memory storing a phase pattern corresponding to the imaginary component of the square phase sequence in a received signal and a second memory storing a phase pattern corresponding to the real component of the square phase sequence in the received signal.

6. A spread spectrum modulating device according to claim 1, wherein the square phase sequence has elements $C_{mi}$ which are defined as $$C_{mi} = \exp((2\pi\sqrt{-1}/N)mi^2)$$

where N is the code length and is an odd prime number, $m = 1, 2, \ldots, N-1$, and $i = 0, 1, \ldots, N-1$.

7. A spread spectrum modulating device according to claim 2, wherein the square phase sequence has elements $C_{mi}$ which are defined as $$C_{mi} = \exp((2\pi\sqrt{-1}/N)mi^2)$$

where N is the code length and is an odd prime number, $m = 1, 2, \ldots, N-1$, and $i = 0, 1, \ldots, N-1$.

* * * * *

UNITED STATES PATENT AND TRADEMARK OFFICE
CERTIFICATE OF CORRECTION

PATENT NO.  : 5 008 898
DATED       : April 16, 1991
INVENTOR(S) : Masahiro Hamatsu et al It is certified that error appears in the above-identified patent and that said Letters Patent is hereby corrected as shown below:

On the face of the patent please change Inventor's name to read ---Masahiro Hamatsu---.

Signed and Sealed this

Twenty-sixth Day of November, 1991

Attest:

HARRY F. MANBECK, JR.

*Attesting Officer*    *Commissioner of Patents and Trademarks*

UNITED STATES PATENT AND TRADEMARK OFFICE
CERTIFICATE OF CORRECTION

PATENT NO.  :  5 008 898
DATED       :  April 16, 1991
INVENTOR(S) :  Masahiro Hamatsu et al It is certified that error appears in the above-identified patent and that said Letters Patent is hereby corrected as shown below:

Column 6, line 57; please correct the mathematical equation to read as follows:

$$--C_{mi} = \exp((2\pi \sqrt{-1}/N)mi^2)--.$$

Column 6, line 64; please correct the mathematical equation to read as follows:

$$--C_{mi} = \exp((2\pi \sqrt{-1}/N)mi^2)--.$$

Signed and Sealed this

Twentieth Day of October, 1992

Attest:

DOUGLAS B. COMER

*Attesting Officer*   Acting Commissioner of Patents and Trademarks